United States Patent [19]

Kawamura

[11] Patent Number: 5,022,357
[45] Date of Patent: Jun. 11, 1991

[54] CONTROL SYSTEM FOR INTERNAL COMBUSTION ENGINE

[75] Inventor: Hideo Kawamura, Samukawa, Japan

[73] Assignee: Isuzu Motors Limited, Tokyo, Japan

[21] Appl. No.: 456,724

[22] Filed: Dec. 26, 1989

[30] Foreign Application Priority Data

Dec. 28, 1988 [JP] Japan ..................... 63-334964

[51] Int. Cl.$^5$ ............... F01L 9/04; F01L 1/34
[52] U.S. Cl. ................. 123/90.11; 123/90.15; 123/348
[58] Field of Search .......... 123/90.11, 90.24, 188 AA, 123/322, 348, 90.15; 251/129.05, 129.1

[56] References Cited

U.S. PATENT DOCUMENTS

| | | |
|---|---|---|
| 3,682,152 | 8/1972 | Muller-Berner ............... 123/90.11 |
| 4,359,022 | 11/1982 | Nakamura et al. ......... 123/188 AA |
| 4,544,986 | 10/1985 | Buchl ......................... 123/90.11 |
| 4,593,658 | 6/1986 | Moloney ..................... 123/90.11 |
| 4,614,170 | 9/1986 | Pischinger et al. .......... 123/90.11 |
| 4,700,684 | 10/1987 | Pischinger et al. .......... 123/90.11 |
| 4,875,452 | 10/1989 | Hara et al. ................... 123/494 |

FOREIGN PATENT DOCUMENTS 170836 10/1983 Japan ..................... 123/90.11
162312 9/1984 Japan ..................... 123/90.11

Primary Examiner—David A. Okonsky
Assistant Examiner—Weilun Lo
Attorney, Agent, or Firm—Staas & Halsey

[57] ABSTRACT

A control system for controlling an internal combustion engine having intake and exhaust valves and a fuel supply unit for supplying fuel into an intake port includes electromagnetic actuators for selectively opening and closing the intake and exhaust valves under electromagnetic forces. An opening or valve lift of the intake valve for obtaining a necessary amount of intake air and an amount of fuel to be injected are calculated on the basis of engine load conditions. The electromagnetic actuators and the fuel supply unit are controlled on the basis of the calculated valve opening and amount of fuel to be injected for thereby controlling the air-fuel mixture ratio of an air-fuel mixture introduced into an engine cylinder.

5 Claims, 2 Drawing Sheets

CONTROL SYSTEM FOR INTERNAL COMBUSTION ENGINE

BACKGROUND OF THE INVENTION

The present invention relates to an engine control system for electromagnetically operating intake and exhaust valves of an internal combustion engine.

In gasoline engines, the amount of intake air to be introduced into engine cylinders is controlled by a throttle valve disposed in an intake pipe and operated by an accelerator pedal.

Since the engine cylinders are spaced a large distance from the throttle valve disposed in the intake pipe, the response of the engine to the operation of the accelerator pedal is relatively slow. Inasmuch as the throttle valve is disposed in the intake pipe, as described above, a vacuum developed in the intake manifold, and hence the pressure in the intake manifold is lowered. Therefore, the temperature in the intake manifold is considerably low in a cold climate. When the ambient temperature is low, fuel injected into the intake manifold by a fuel injection valve is not atomized well. Such poor atomization of the fuel is one of the reasons for inefficient fuel combustion at low temperatures.

Electromagnetic valve control systems for controlling the timing of operation of the intake and exhaust valves of internal combustion engines through an electromagnetic actuator means are disclosed in Japanese Laid-Open Patent Publication Nos. 58(1983)-183805 and 61(1986)-76713. These publications only show the operation of the intake and exhaust valves with the electromagnetic drive means. The disclosed electromagnetic valve control systems cannot solve the above problem because the amount of intake air is controlled by the throttle valve disposed in the intake valve.

SUMMARY OF THE INVENTION

It is an object of the present invention to provide a control system for controlling an internal combustion engine to operate with a good response to the operation of an accelerator pedal of the engine.

Another object of the present invention is to provide a control system for controlling an internal combustion engine so that fuel injected into an intake manifold can well be atomized even in a colder climate.

According to the present invention, there is provided a control system for controlling an internal combustion engine having intake and exhaust valves and a fuel supply unit for supplying fuel into an intake port which is openable and closable by the intake valve, the control system comprising electromagnetic actuator means for selectively opening and closing the intake and exhaust valves, a fuel injection nozzle for injecting fuel from the fuel supply unit into the intake port, an engine load sensor for detecting a load on the internal combustion engine, a crankshaft angle sensor for detecting an angular position of a crankshaft of the internal combustion engine, first calculating means for calculating openings of the intake and exhaust valves and timings to open the intake and exhaust valves based on detected signals from the engine load sensor and the crankshaft angle sensor, second calculating means for calculating an amount of fuel to be injected and a timing to inject fuel based on detected signals from the engine load sensor and the crankshaft angle sensor, first control means for applying drive signals to the electromagnetic actuator means based on the openings and timings calculated by the first calculating means, and second control means for applying a control signal to the fuel supply unit based on the amount and timing calculated by the second calculating means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
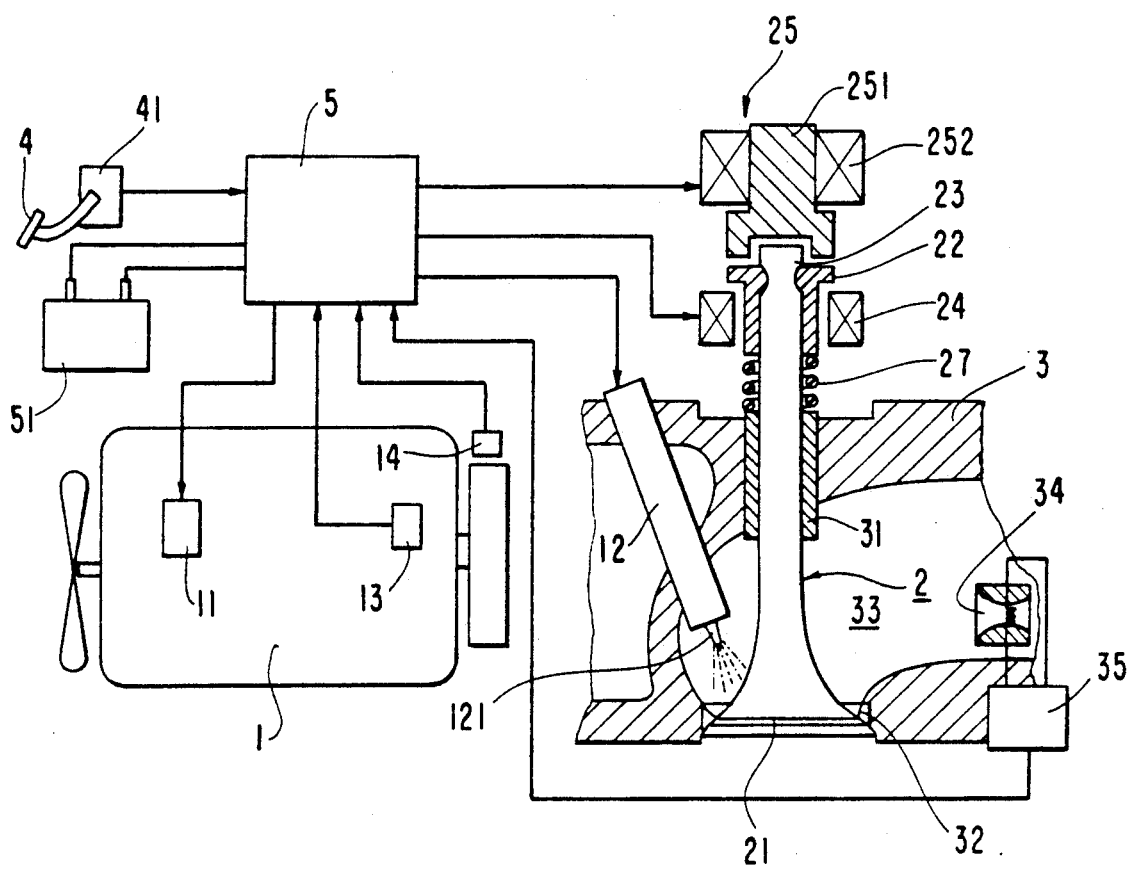
FIG. 1 is a schematic diagram, partly in cross section, of a control system for an internal combustion engine according to the present invention.

FIG. 1 shows a control system for controlling an internal combustion engine according to the present invention.

As shown in FIG. 1, an internal combustion engine 1 is mounted on a motor vehicle (not shown) for driving the motor vehicle. The internal combustion engine 1 is supplied with fuel from a fuel supply unit, 11 such as a fuel injection pump. The fuel supply unit 11 delivers fuel to injection nozzle 12 for injecting a certain amount of fuel in response to a command signal from a controller 5, described later on. The top dead center position of the piston in each of the cylinders of the internal combustion engine 1 and the angular position of the crankshaft of the engine 1 are detected by a crankshaft angle sensor 13. An engine speed sensor 14 for detecting the rotational speed of the engine 1 is positioned in opposing relation to a flywheel 1a of the engine 1. Detected signals from the sensors 13, 14 are also sent to the controller 5.

An intake valve 2 in each cylinder of the internal combustion engine 1 is made of a ceramic material such as silicon nitride, silicon carbide, or the like, and is slidably fitted in a valve guide sleeve 31 mounted in a cylinder head 3 and made of a ceramic material such as silicon nitride, silicon carbide, or the like. The intake valve 2 includes a valve head 21 which can be seated on and unseated from a valve seat 32 to open and close an intake port 33 for thereby controlling the stream of intake air flowing into the engine cylinder therethrough. A movable member 22 of a ferromagnetic material such as soft steel is fixedly fitted over the upper end of a stem 23 of the intake valve 2. A lower coil 24 is disposed around the movable member 22. When the lower coil 24 is energized, it magnetically moves the movable member 22 in the axial direction of the intake valve 2. An electromagnet 25 is disposed upwardly of and in opposing relation to the movable member 22. The electromagnet 25 comprises a fixed member 251 made of a ferromagnetic material such as soft steel and an upper coil 252 fixed to and disposed around the fixed member 251. The movable member 22, the lower coil 24, the fixed member 251, and the upper coil 252 jointly serve as an electromagnetic actuator means for electromagnetically actuating the intake valve 2. When electric power is supplied from a battery 51 to the coils 24, 252 through the controller 5 and the polarity and voltage of the supplied electric power are controlled, the electromagnetic actuator means controls the opening and closing of the intake valve 2 and the intensity of forces to open and close the intake valve 2.

A coil spring 27 is disposed around the valve stem 23 between the movable member 22 and the valve guide sleeve 31 for normally urging the intake valve 2 to close the intake port 33 and prevent the intake valve 2 from dropping when the coils 24, 252 are de-energized.

In this embodiment, only the intake valve 2 is shown and described. However, an exhaust valve may be identically constructed and operated except that its timing of opening and closing the exhaust port is different from that of the intake valve. An electromagnetic actuator means for operating such an exhaust valve is also identical to the electromagnetic actuator means shown in FIG. 1. Therefore, the exhaust valve and its electromagnetic actuator means will not be described below.

The fuel injection nozzle 12 extends through the cylinder head 3 into the intake port 33 and has a nozzle orifice 121 directed such that a spray of fuel injected by the nozzle orifice 121 impinges upon the valve head 21 of the intake valve 2. Therefore, the fuel injected from the nozzle orifice 121 is heated and scattered by the intake valve 2 when it impinges upon the valve head 21, so that the fuel is effectively atomized.

An air flow meter 34 is disposed in the intake port 33. The air flow meter 34 may comprise, for example, an electric heating wire supplied with an electric current. The rate of flow of air in the intake port 33 can be detected by the air flow meter 34 based on a change in the electric resistance of the electric heating wire. A detected signal from the air flow meter 34 is processed by an air flow rate processor 35 into an air flow rate signal, which is then applied to the controller 5.

The load on the internal combustion engine 1 can be controlled by an accelerator pedal 4. The depth to which the accelerator pedal 4 is depressed is detected by an accelerator pedal movement sensor 41, which supplies a detected signal to the controller 5.

The controller 5 comprises a microcomputer which includes a central processing unit for effecting various arithmetic operations based on a control program, memories for storing the control program, various data, etc., and an input/output interface. When the controller 5 is supplied with signals from the sensors 13, 14, 35, 41, the controller 5 processes the supplied signals according to the control program to calculate the timing of opening and closing the intake valve 2 and the exhaust valve, the openings of these valves, the timing of injecting fuel, and the amount of fuel to be injected, controls the polarity and voltage of electric power from the battery 51, and supplies the controlled electric power to the coils 24, 252 which electromagnetically control the intake valve 2 and the exhaust valve to open or close the intake and exhaust ports. The controller 5 also controls the fuel supply unit 11 and the fuel injection nozzle 12.

The battery 51 also supplies electric power to the controller 5, the coils 24, 252, the fuel supply unit 11, and the fuel injection nozzle 12.

Figure 2:
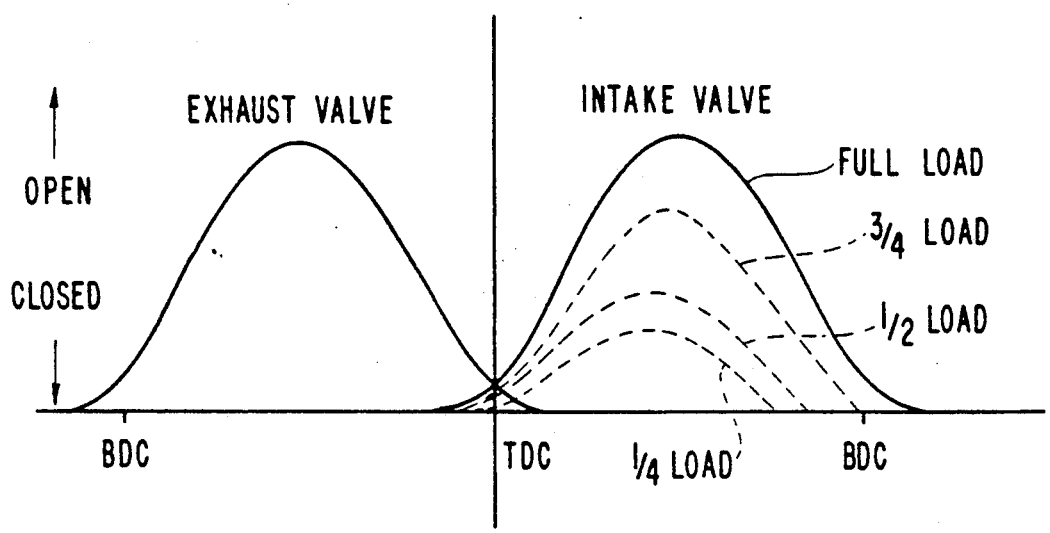
FIG. 2 is a graph illustrative of the timing of opening and closing intake and exhaust valves with respect to crankshaft angles.

FIG. 2 represents a control map for controlling the timing of opening and closing the intake valve 2 and the exhaust valve and also the openings of these valves with respect to the crankshaft angle. The control map is stored in the memory of the controller 5. As shown in FIG. 2, the opening of the intake valve 2, i.e., the valve lift and the timing of opening and closing the intake valve 2, is determined depending on the load on the internal combustion engine, i.e., the depression of the accelerator pedal 4, so that the amount of fuel injected and the amount of intake air to be introduced, i.e., the load on the internal combustion engine, will be held at a stoichiometric air-fuel mixture ratio. The timing of opening and closing the exhaust valve and the opening of the exhaust valve are predetermined with respect to the crankshaft angle.

Figure 3:
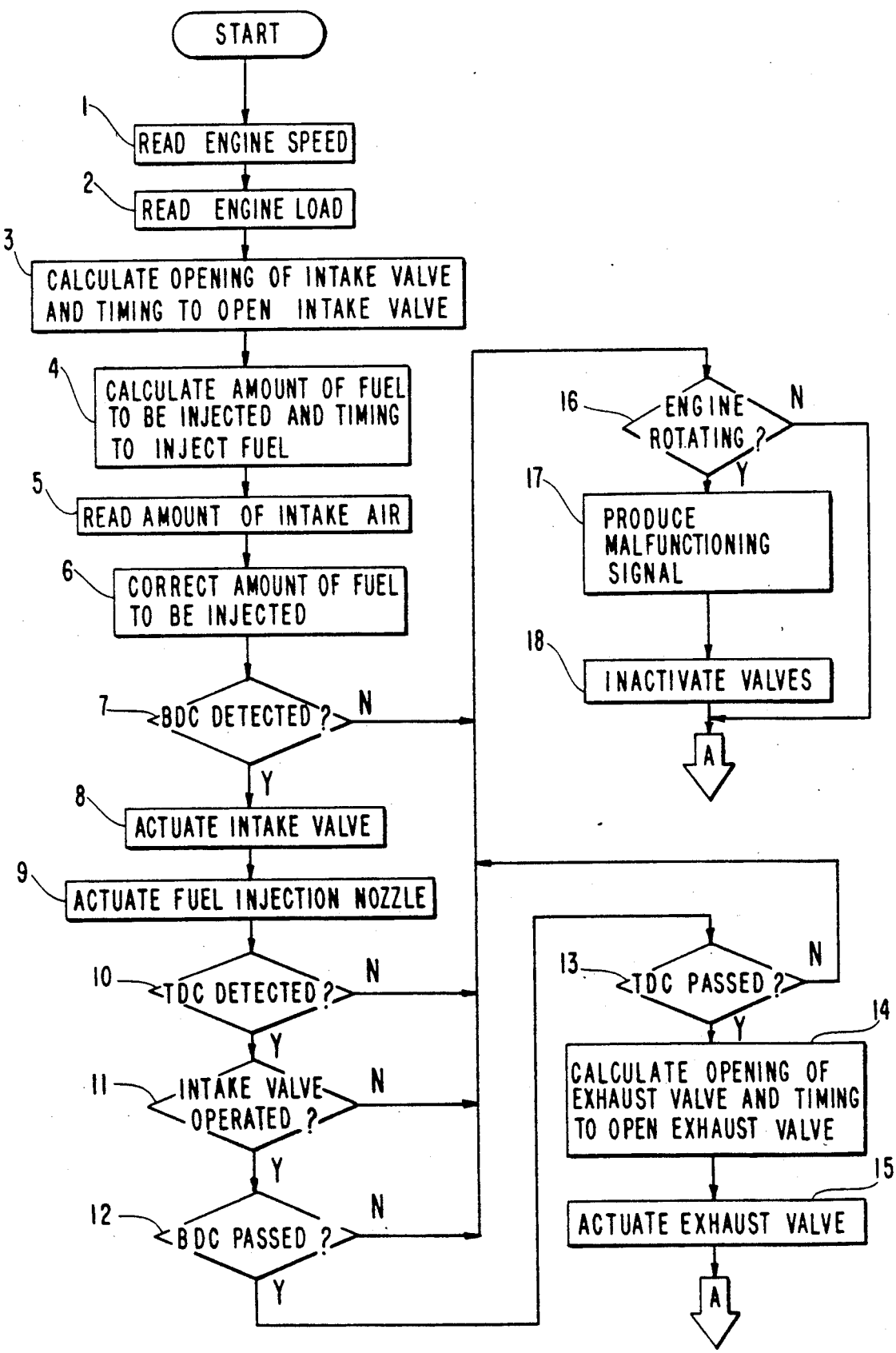
FIG. 3 is a flowchart of an operation sequence of the control system shown in FIG. 1.

Operation of the engine control system thus constructed will be described below with reference to the flowchart of FIG. 3.

The controller 5 reads an engine rotational speed from the detected signal from the engine speed sensor 14 in a step 1, and also reads an engine load from the detected signal from the accelerator pedal movement sensor 41 in a step 2. Then, in a step 3, the controller 5 calculates, based on these engine load conditions, i.e., the engine rotational speed and the engine load, an opening or valve lift of the intake valve 2 for obtaining a necessary amount of intake air, and a period in which to open the intake valve 2 with reference to the bottom dead center (BDC) position of the piston. Based on the engine load conditions, the controller 5 also calculates an amount of fuel to be injected and a timing to inject fuel with reference to the BDC position of the piston in a step 4. The controller 5 reads an amount of intake air introduced from the signal from the air flow rate processor 35 in a step 5. The controller 5 then corrects, in a step 6, the amount of fuel to be introduced that has been calculated in the step 4 so that the amount of fuel to be injected and the amount of intake air introduced will be held at a stoichiometric air-fuel mixture ratio.

In a step 7, the controller 5 detects the BDC position of the piston from the detected signal from the crankshaft angle sensor 13 which detects the angular position of the crankshaft. The controller 5 thereafter energizes the coils 252, 24 in a step 8 in order to open the intake valve 2 for the calculated valve opening, i.e., the valve lift, over the valve opening period calculated in the step 3. Then, the controller 5 controls the fuel supply unit 11 and the fuel injection nozzle 12 in a step 9 in order to inject the amount of fuel corrected in the step 6 at the fuel injection timing calculated in the step 4.

After the controller 5 detects the top dead center (TDC) position of the piston from the detected signal from the crankshaft angle sensor 13 in a step 10, the controller 5 checks in a step 11 if the intake valve 2 has been operated or not based on the detected signal from the air flow meter 34. If it is confirmed in the step 11 that the intake valve 2 has been operated, the controller 5 checks in a step 12 if the piston has moved past the BDC, which is the end of the intake stroke, from the detected signal from the crankshaft angle sensor 13. Then, the controller 5 checks in a step 13 if the piston has moved past the TDC position from the detected signal from the crankshaft angle sensor 13. Thereafter, the controller 5 calculates an opening or valve lift of the exhaust valve and a period in which to open the exhaust valve with reference to the TDC position of the piston in a step 14, which is followed by a step 15 in which the controller 5 controls the electromagnetic actuator means for the exhaust valve based on the valve opening and period calculated in the step 14.

If the movement of the piston to and past the TDC and the BDC positions is confirmed in the steps 7, 10, 12, 13 and if the operation of the intake valve 2 is not confirmed in the step 11, then control goes to a step 16 in which the controller 5 determines whether the engine is rotating or not based on the detected signal from the engine speed sensor 14. If the engine is rotating, then the controller 5 generates a malfunctioning signal in a step 17, and inactivates the valves in a step 18.

With the present invention, as described above, an opening or valve lift of the intake valve 2 for obtaining a necessary amount of intake air is calculated on the basis of engine load conditions, and the electromagnetic actuator means for the intake valve is controlled on the basis of the calculated valve opening o valve lift to control the amount of intake air to be introduced. Therefore, it is not necessary to have a throttle valve installed in the intake pipe as with conventional engines. The engine control system of the invention can also eliminate an air-fuel mixture failure which would otherwise result from a reduction in the speed of flow of intake air due to the presence of a throttle valve in the intake pipe. Since no throttle valve is needed, no vacuum is developed in the intake manifold. Therefore, the temperature in the intake manifold is prevented from being lowered excessively even at low temperatures. Fuel injected into the intake manifold from the fuel injection nozzle can be atomized well in colder climates. Moreover, since the fuel injection nozzle 12 is oriented such that the fuel injected therefrom impinges upon the valve head 21 of the intake valve 2, the fuel injected through the nozzle orifice 121 is heated and scattered when it impinges upon the valve head 21, so that the injected fuel is atomized effectively. The distance over which the air-fuel mixture flows is shortened, making the engine highly responsive to the operation of the accelerator pedal.

Although a certain preferred embodiment has been shown and described, it should be understood that many changes and modifications may be made therein without departing from the scope of the appended claims.

What is claimed is:

1. A control system for controlling an internal combustion engine having intake and exhaust valves and a fuel supply unit for supplying fuel into an intake port which is openable and closable by the intake valve, said intake valve being the sole means of controlling the amount of charge from atmosphere into the combustion chamber, said control system comprising:

electromagnetic actuator means for selectively opening and closing the intake and exhaust valves;
   a fuel injection nozzle for injecting fuel from the fuel supply unit into the intake port;
   an engine load sensor for detecting a load on the internal combustion engine;
   a crankshaft angle sensor for detecting an angular position of a crankshaft of the internal combustion engine;
   first calculating means for calculating timings to open the intake and exhaust valves based on detected signals from said engine load sensor and said crankshaft angle sensor;
   second calculating means for calculating an amount of opening of the intake valve to introduce an amount of intake air which achieves a stoichiometric air-fuel ratio corresponding to the load on the internal combustion engine based on a detected signal from said engine load sensor;
   third calculating means for calculating an amount of fuel to be injected and a timing to inject fuel based on detected signals from said engine load sensor and said crankshaft angle sensor;
   first control means for applying drive signals to said electromagnetic actuator mans based on the openings and timings calculated by said first and second calculating means; and
   second control means for applying a control signal to the fuel supply unit based on the amount and timing calculated by said third calculating means.

2. A control system according to claim 1, wherein said intake valve has a valve head, said fuel injection nozzle being oriented such that fuel injected thereby impinges upon said valve head.

3. A control system according to claim 1, further including means for detecting an amount of air flowing through the intake port, and fourth calculating means for correcting the amount of fuel to be injected which is calculated by said third calculating means so that the amount of fuel to be injected and the amount of air flowing through the intake port will be held at stoichiometric air-fuel a mixture ratio.

4. A control system according to claim 1, wherein each of said intake and exhaust valves is made of a ceramic material.

5. A control system according to claim 1, wherein the internal combustion engine is a gasoline internal combustion engine.

* * * * *